(12) United States Patent
Dodelet et al.

(10) Patent No.: US 7,250,188 B2
(45) Date of Patent: Jul. 31, 2007

(54) DEPOSITING METAL PARTICLES ON CARBON NANOTUBES

(75) Inventors: Jean Pol Dodelet, Ste-Julie (CA); Xuellang Sun, St-Hubert (CA); Ruying Li, St-Hubert (CA); Dominique Villers, ChateauGuay (CA); Sylvain Desilets, St-Augustin (CA)

(73) Assignee: Her Majesty the Queen in right of Canada, as represented by the Minister of National Defense of her Majesty's Canadian Government, Ottawa (CA)

( * ) Notice: Subject to any disclaimer, the term of this patent is extended or adjusted under 35 U.S.C. 154(b) by 0 days.

(21) Appl. No.: 10/813,697

(22) Filed: Mar. 31, 2004

(65) Prior Publication Data

US 2005/0220988 A1 Oct. 6, 2005

(51) Int. Cl.
*B05D 5/12* (2006.01)
*B05D 1/18* (2006.01)

(52) U.S. Cl. ............... 427/115; 427/430.1; 427/443.2; 427/113; 427/125; 977/948; 977/842

(58) Field of Classification Search ........... 427/113, 427/115, 123, 125, 180, 202, 205, 229, 243, 427/244, 383.1, 383.3, 430.1, 443.2, 903; 423/445 R, 445 B, 447.1, 447.2, 447.3, 460; 429/40, 44, 45
See application file for complete search history.

(56) References Cited

U.S. PATENT DOCUMENTS

| | | | |
|---|---|---|---|
| 6,752,977 B2 * | 6/2004 | Smalley et al. | 423/447.1 |
| 6,824,689 B2 * | 11/2004 | Wang et al. | 210/660 |
| 2002/0172767 A1 * | 11/2002 | Grigorian et al. | 427/255.28 |
| 2002/0177032 A1 * | 11/2002 | Suenaga et al. | 429/44 |
| 2003/0086858 A1 * | 5/2003 | Niu et al. | 423/447.1 |
| 2003/0202930 A1 * | 10/2003 | Dodelet et al. | 423/447.3 |
| 2004/0018416 A1 * | 1/2004 | Choi et al. | 429/44 |
| 2004/0180244 A1 * | 9/2004 | Tour et al. | 429/13 |
| 2004/0224217 A1 * | 11/2004 | Toops | 429/44 |

OTHER PUBLICATIONS

"Growth of carbon nanotubes on carbon paper by Ohmically heating silane-dispersed catalytic sites", Sun et al., Chem. Phys. Lett. 363, pp. 415-421, Sep. 16, 2002.*
"Pt-Ru/Carbon fiber nanocomposites: synthesis, characterization, and performance as anode catalysts of direct methanol fuel cells. A search for exceptional performance", Steigerwalt et al., J. Phys. Chem. B, pp. 760-766, 2002.*
"Chemical Modification of Proton Exchange Membrane Fuel Cell Catalysts with a Sulfonated Silane", Easton et al., Electrochemical and Solid-State Letters, Abstract, May 2001.*
"Chemical Modification of Fuel Cell Catalysts and Electrochemistry of Proton Exchange Membrane Fuel Cell Electrodes", Easton, Graduate Thesis (Chapter 4), Jan. 2003.*

\* cited by examiner

*Primary Examiner*—Timothy Meeks
*Assistant Examiner*—David Turocy
(74) *Attorney, Agent, or Firm*—George Seaby

(57) ABSTRACT

Metal catalyst particles are deposited on carbon nanotubes by preparing a silane solution of a metal catalyst salt, e.g. platinum or ruthenium chloride, immersing an electrically conducting substrate carrying nanotubes in the silane solution to yield a composite structure of substrate, nanotubes and catalyst, and reducing the composite structure to yield a composite of substrate, carbon nanotubes and metallic catalyst particles.

17 Claims, 3 Drawing Sheets

DEPOSITING METAL PARTICLES ON CARBON NANOTUBES

BACKGROUND OF THE INVENTION

1. Field of the Invention

This invention relates to a method of depositing metal particles on carbon nanotubes.

2. Discussion of the Prior Art

Carbon nanostructures have been used as metal catalyst supports in electrochemistry and fuel cells [see, for example H. Baughman et al, *Science*, 297, 787 (2002), G. Che et al, *Langmuir*, 15, 750 (1999), Z. Liu et al, *Langmuir*, 18, 4054 (2002), W. Li et al, *Carbon*, 40, 787 (2002), E. G. Steigerwalt et al, *J. Phys. Chem. B*, 106, 760 (2002) and T. Yoshitake, et al, *Physica B*, 323, 124 (2002)]. However, in the past, catalysts have been deposited on loose nanostructures, nanofibers and nanohorns just as on carbon black. When such carbon nanostructures were used in fuel cells, acceptable or better performance was always reported. However, it has been shown [see E. B. Easton et al, *Electrochem. Solid-State Lett.*, 3, 359 (2000)] that when platinum on carbon black is used in fuel cells, only a fraction of the Pt-based catalyst is electrically connected to the backing electrode.

Carbon nanotubes are hydrophobic which makes it difficult for metal particles to adhere to them. E. Dujardin et al, *Science*, 265, 1850 (1994) have reported that carbon nanotubes could not be wet by liquids with a surface tension higher than 100–200 mn/m which means that most metals would not adhere to them. In order to improve adhesion of metals to nanotubes, two main approaches have been proposed, namely surface modification and sensitization activation. The former involves oxidation of the nanotube surface in order to create functional groups and increase metal nucleation [see Y. P. Sun et al, *Acc. Chem. Res.*, 35, 1096 (2002) and T. W. Ebbesen et al, *Adv. Mater*, 8 155 (1996)]. Sensitization activation involves the generation of small nuclei, for example of Pd—Sn to promote metal deposits on carbon nanotubes [see Z. Liu et al, supra and L. M. Ang et al, *Carbon*, 38, 363 (2000)]. However, a need still exists for an efficient method of depositing metals, and in particular metallic catalysts on carbon nanotubes.

GENERAL DESCRIPTION OF THE INVENTION

The object of the present invention is to meet the above-defined need by providing a simple method of depositing metal catalyst particles on carbon nanotubes and a carbon substrate which results in minimal contact resistance between the nanotubes and the substrate. The deposition of metal catalyst particles on nanotubes, which are themselves in electrical contact with a conductive carbon backing, is expected to dramatically improve catalyst utilization, especially at low catalyst loading.

GENERAL DESCRIPTION OF THE INVENTION

Accordingly, the present invention provides a process for producing carbon nanotubes with metallic catalyst particles thereon comprising the steps of:

(a) preparing a silane solution of a metallic catalyst;

(b) immersing an electrically conducting substrate carrying carbon nanotubes in the silane solution to yield a composite of substrate, carbon nanotube and metallic catalyst structure; and (c) reducing the composite structure to yield a composite of substrate, carbon nanotube and metallic catalyst particle structure.

BRIEF DESCRIPTION OF THE DRAWINGS

The invention is described below in greater detail with reference to the accompanying drawings, wherein.

DESCRIPTION OF THE PREFERRED EMBODIMENT

Figure 1:
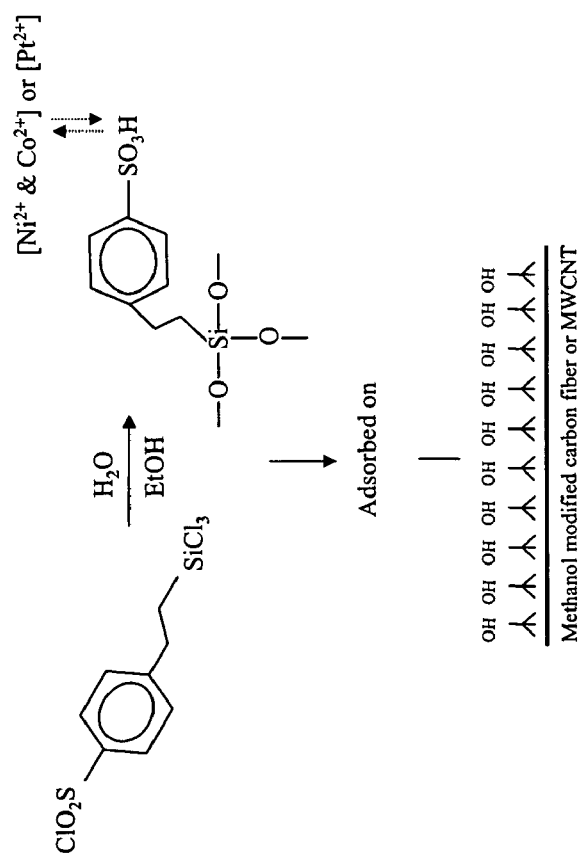
FIG. 1 is a schematic reaction of silane derivative as used in the preparation of MWCNTs.

Published U.S. Patent Application 2003-0202930, which is incorporated herein by reference, describes a method of producing carbon nanotubes on carbon paper backing or substrate. As described in detail in the application, multi-walled carbon nanotubes (MWCNTs) were produced by heating Co—Ni particles deposited on the fibers of carbon paper in a specifically designed chemical vapor deposition (CVD) reactor. This reactor takes advantage of the fact that the carbon fuel cell backing (E-TEK, Division of DeNora with 81% porosity) is a conducting material, which is heated by the Joule effect up to 800° C., a temperature high enough to decompose ethylene and grow nanotubes. The surface polarity of the support can be modified by methanol pre-treatment of the support. Prior to Co—Ni deposition, the carbon backings were pretreated with methanol for 30 min, in order to improve the homogeneity of the Co—Ni particle sizes and their distributions on the carbon fibers of the backing. Details of Co—Ni particle deposition were described previously [X. Sun et al, *Chem. Phys. Lett,* 363, 415 (2002) and X. Sun et al, *International Journal of Nanoscience,* 1, 223 (2002)]. As illustrated schematically in FIG. 1, an important step in the fabrication of the MWCNTs is the use of a commercially available silane derivative 2(4-chlorosulfonylphenyl) ethyl trichlorosilane available from United Chemical Technologies which, upon hydrolysis, forms a sulfonic acid-silicate, permitting the exchange of $H^+$ for $Co^{2+}$ and $Ni^{2+}$ ions. The latter ions are the precursors of the Co—Ni particles. Platinum deposition on nanotubes and the carbon paper substrate was effected using the same silane derivative, but using $Pt^{2+}$ ions as Pt particle precursors.

In the present case, a metal selected from the group consisting of platinum, palladium, titanium, ruthenium, gold, nickel, cobalt, silver, manganese, molybdenum and alloys thereof is deposited on the MWCNTs using a silane derivative.

EXAMPLE 1

In a preferred embodiment of the invention, Pt is deposited using 2(4-chlorosulfonylphenyl) ethyl trichlorosilane and platinum chloride. The MWCNT/carbon paper composite was immersed in a solution containing 0.04 M $PtCl_2$, 1 vol % silane derivative and 6 vol % water in ethanol. The composite structure was then dried at room temperature and reduced in a stream of $H_2$+Ar at 550–600° C. and preferably 580° C. for 15 minutes. The 30 minute methanol pretreatment of the MWCNTs/carbon paper composite described in the earlier published application was also used with success to improve the distribution of the Pt on the nanotubes.

A Hitachi-9000 NAR high-resolution transmission electron microscope (HRTEM), with energy dispersive X-ray spectroscopy (EDX), operated at 300 kV was employed to characterize the structure, composition and morphology of the resulting carbon nanotubes and Pt particles.

Figure 2:
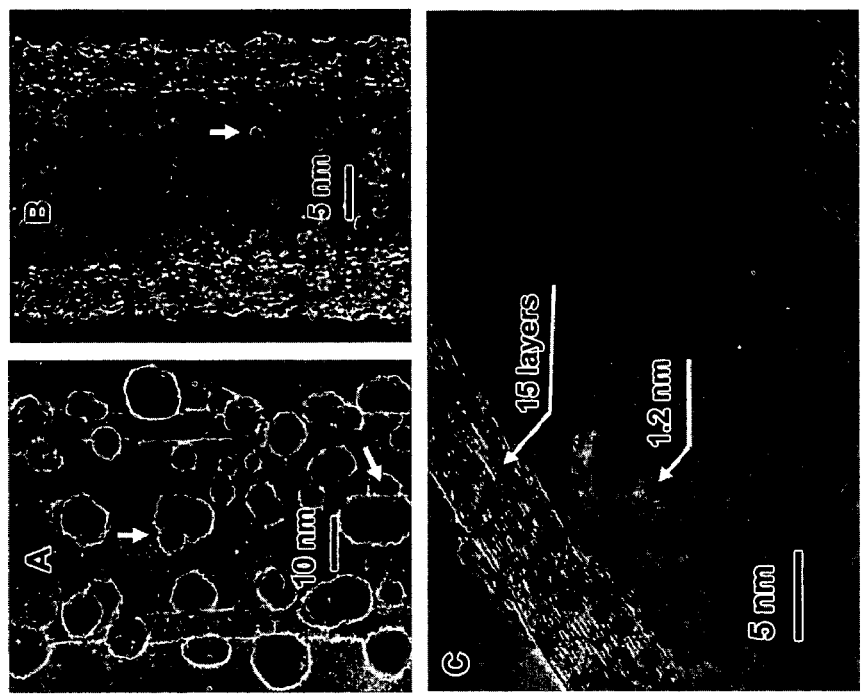
FIG. 2 shows transmission electron micrographs (TEMs) of Pt nanoparticles on MWCNTs.

It is possible to deposit Pt particles on these nanotubes by simply adsorbing Pt ions for 2 hours from a Pt ion aqueous solution on methanol pretreated MWCNT/carbon paper. This procedure yields large (~4–10 nm) Pt particles after heat treatment in a reducing atmosphere, as shown in FIG. 2A. However, much smaller Pt particles (FIG. 2B) are obtained when Pt ions are dispersed on MWCNT/carbon paper using the silane derivative procedure (FIG. 1) to adsorb Pt ions onto the nanotubes. A magnified view of the homogeneous dispersion of the small Pt particles is presented in FIG. 2C, which also displays the graphitic structure of the nanotube walls, comprising 15 concentric graphene sheets. The tube has an outer diameter of nearly 35 nm with a hollow center of about 25 nm. The size of about 100 Pt particles was measured on a high resolution TEM micrography and an average Pt particle size of 1.2±0.3 nm was determined. The EDX compositional analysis of several Pt nanoparticles confirms the presence of Pt, along with a small amount of Co and Ni, which have their origin in the metals used as catalysts for the nanotube growth. An important point to stress is that neither S (a poison for Pt) nor Si signals were detected by EDX, with the Pt signal. It should also be noted that all Pt particles are located on the external surface of the tubes because the tubes were not opened. The density of the Pt particles, based on averaging the measurements performed from HRTEM micrographies on tubes, is nearly one particle/100 $nm^2$. Accordingly, if one typical nanotube is 20 μm long and 40 nm in diameter, it will be decorated with $2.5 \times 10^4$ Pt particles on its outer wall.

It is of practical importance for fuel cell applications to show that:

(i) the MWCNTs are in electrical contact with the fuel cell backing (ii) the Pt particles are in electrical contact with MWCNTs.

The electrochemical properties of the electrode materials were investigated by cyclic voltammetry in a standard three-electrode cell. A Pt foil served as counter electrode, and a saturated calomel electrode (SCE) was used as reference electrode. All working electrodes had the same 1 $cm^2$ of geometrical surface. Cyclic voltammetry measurements were carried out using a 273A EGG Potentiostat with a 10 mV/s sweep rate. $Fe(CN)_6^{3-/4-}$ were used as the oxydo-reduction couple (as a 10 mM solution of $K_3Fe(CN)_6$ in 0.5M $K_2SO_4$) for the bare carbon paper and for the MWCNT/carbon paper electrodes. A $H_2SO_4$ solution at pH 1, purged with Ar, was used to perform the voltammetry of Pt particles deposited on MWCNT/carbon paper. For all those experiments, the voltammograms were recorded after cycling the working electrode at least 20 times, at 50 mV/s, in the same potential range as that used to record the voltammetry.

Figure 4:
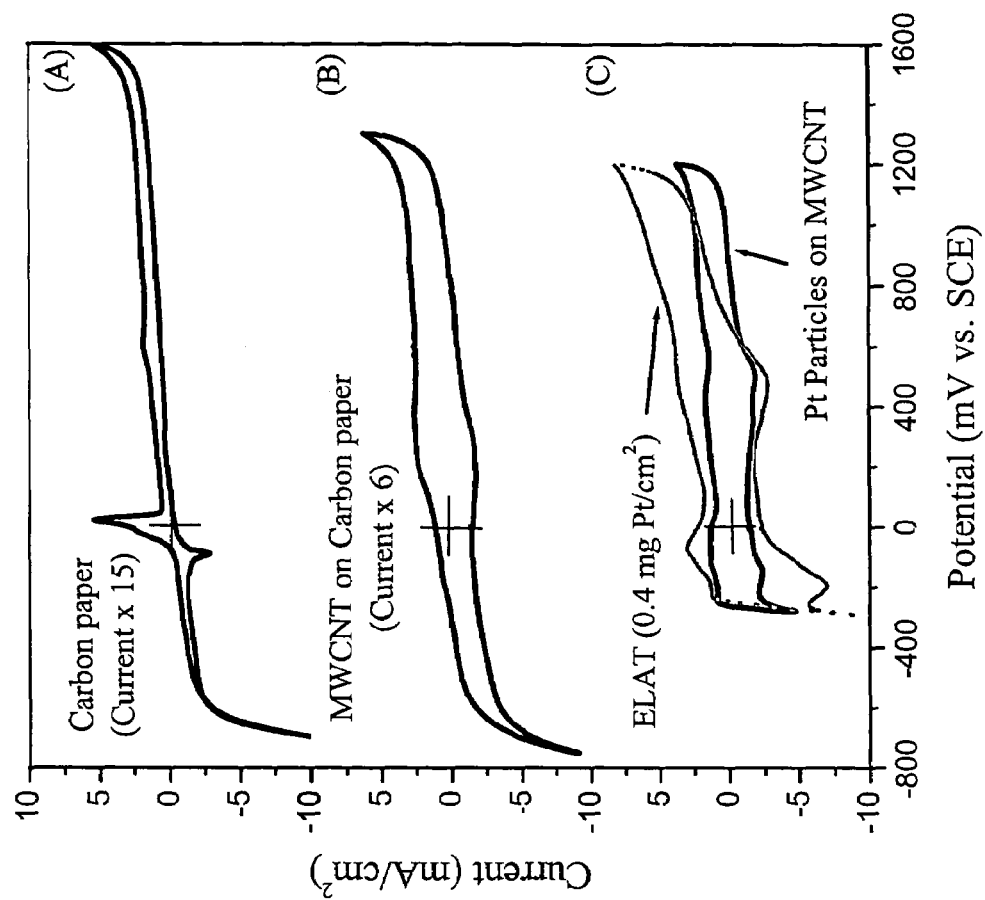
FIG. 4 shows cyclic voltammograms in $H_2SO_4$ (pH 1) of (A) bare carbon paper, (B) MWCNTs grown on carbon paper and (C) small Pt particles on MWCNTs.
Figure 3:
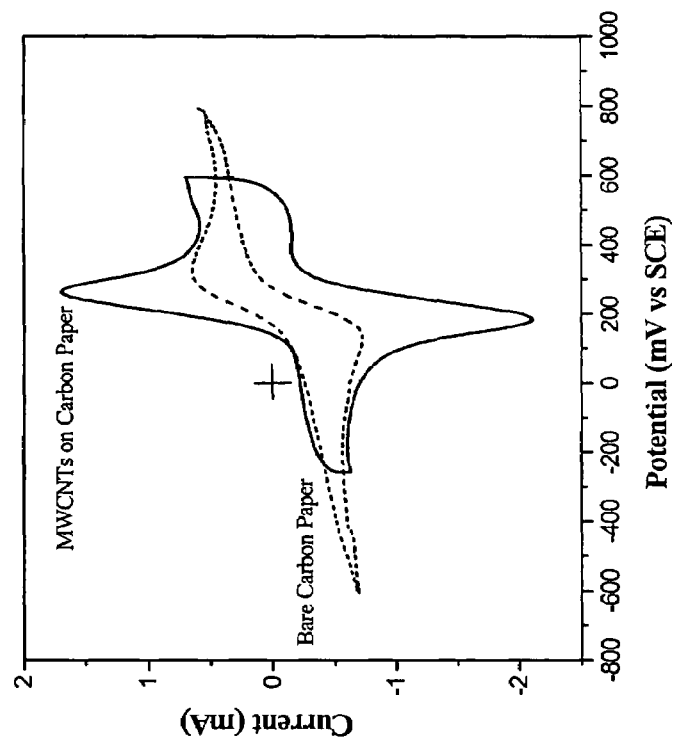
FIG. 3 shows cyclic voltammograms in $K_3Fe(CN)_6$ aqueous solutions of bare carbon paper substrate and MWCNTs deposited on carbon paper.

The electrical contact between MWCNTs and the carbon fibers of the fuel cell backing is demonstrated in FIG. 3. This figure shows the voltammetry of the $Fe(CN)_6^{3-/4-}$ couple on a bare carbon paper and on MWCNTs grown on the carbon paper. A typical voltammogram with graphite features and a higher available electroactive surface is obtained on MWCNTs, strongly suggesting that these nanotubes are electrically connected to the carbon backing. The electrical contact of Pt particles with MWCNTs is demonstrated, in FIG. 4, by the voltammetry occurring on Pt in an Ar purged $H_2SO_4$ solution of pH 1. A comparison of voltammograms B, and C of FIG. 4 clearly show that the characteristic features of Pt surface electrochemistry, superimposed on a capacitive current, are seen in the voltammogram displayed in C of FIG. 4. The latter voltammogram suggests that Pt particles are also electrically connected to the carbon nanotubes. FIG. 4C also displays the voltammogram of a commercial Pt electrode (ELAT™ from E-TEK, Inc.) for comparison A short-time stability test for Pt particles on MWCNTs was performed by immersing the electrode in $H_2SO_4$ (pH 1) for 18 h. TEM observation of this electrode indicates that Pt particles are not removed by this treatment and that they maintain their small size. The MWCNTs remain also strongly bond to the carbon paper substrate.

EXAMPLE 2

PtRu alloy is currently the most popular catalyst used in polymer electrolyte fuel cells for the oxidation of hydrogen in the presence of several tens of ppm of CO. It is also the preferred catalyst used for the oxidation of methanol in direct MeOH fuel cells.

MWCNTs were synthesized on carbon paper at approximately 800° C. from the decomposition of ethylene on Co—Ni catalyst particles that were dispersed by a silane intermediate layer adsorbed onto the carbon fibers. Prior to depositing PtRu clusters on the carbon nanotube and carbon fiber composite, different pretreatments of the composite were effected to anchor the bimetallic particles to the tubes. The pretreatment includes (i) methanol immersion for 30 min, (ii) silane pyrolysis at 800° C. under $H_2$+Ar for 10 min, (iii) immersion in concentrated $H_2SO_4$+$HNO_3$ (50:50 vol) at 140° C. for 5 min or (iv) treatment with 70% nitric acid for 2 to 20 hours. Pretreatments (ii) and (iii) give a larger density of Pt—Ru alloy nanoparticles than pretreatment (i).

Figure 5:
FIG. 5 is a high resolution TEM of PtRu particles deposited on a carbon nanotube.

PtRu alloy was deposited on a MWCNT/carbon paper composite by immersing the composite for 2 hours in a solution containing 0.04 M $PtCl_2$, 0.04 M $RuCl_2$, 1 vol % of sulfonated silane, 6 vol % water and ethanol. The concentration of the chloride(s) is sufficient to give a concentration of at least one of Pt and Ru of 0.2 to 2 M. The composite was then dried at room temperature and reduced in a flow of $H_2$+Ar at 580° C. for 15 min before examination by HRTEM. FIG. 5 is a typical HRTEM image showing deposits of PtRu particles. The tube has an outer diameter of nearly 25 nm with a hollow (inner diameter) of about 13 nm. The walls of the tube consist of about 15 cylindrical graphene layers. Nanoparticles are clearly seen to decorate the MWCNTs and they are evenly distributed over the walls of the tubes. The particles are located only on the external surfaces of the tubes, because the tubes were not opened by the pretreatments, even the short immersion in concentrated $H_2SO_4$+$HNO_3$. The particle size distribution Is quite narrow, with an average size of less than 1.5 nm.

We claim:

1. A process for producing carbon nanotubes with metal catalyst particles thereon comprising the steps of;
    a) preparing a silane solution of 2(4-chlorosulfonylphenyl) ethyl trichlorosilane and a metal catalyst, wherein the metal catalyst is at least one of platinum and ruthenium;
    b) immersing an electrically conducting substrate carrying carbon nanotubes in the silane solution, the silane solution containing at least one of a platinum and a ruthenium salt to yield a composite structure of substrate, carbon nanotube and metal catalyst; and
    c) reducing the composite structure to yield a composite of substrate, carbon nanotube and metal catalyst particles.

2. The process of claim 1, wherein, prior to immersion in the silane solution, the substrate carrying carbon nanotubes is treated with one of an alcohol and an acid.

3. The process of claim 2, wherein the substrate carrying carbon nanotubes is treated with methanol.

4. The process of claim 2, wherein the substrate carrying carbon nanotubes is treated with nitric acid.

5. The process of claim 4, wherein the substrate carrying carbon nanotubes is treated with 70% nitric acid for 2 to 20 hours.

6. The process of claim 1, wherein the substrate is carbon paper and the carbon nanotubes are multi-walled carbon nanotubes.

7. The process of claim 1, wherein the salt is at least one of platinum chloride and ruthenium chloride.

8. The process of claim 1, wherein the silane solution contains sufficient salt to give a concentration of at least one of platinum and ruthenium of 0.02 to 2 M.

9. The process of claim 1, wherein the silane solution is a solution of 0.04 M $PtCl_2$, 1 volume percent 2(4-chlorosulfonylphenyl) ethyl trichlorosilane and 6 volume percent water in ethanol.

10. The process of claim 9, wherein the composite structure is reduced at a temperature of 550 to 600° C. in a hydrogen-argon atmosphere.

11. The process of claim 10, wherein reduction of the composite structure is effected by heating the structure at 580° C. in a stream of $H_2$—Ar for 15 minutes.

12. The process of claim 1, wherein the silane solution is a solution of 0.04 M $RuCl_2$, 1 volume percent 2(4-chlorosulfonylphenyl) ethyl trichlorosilane and 6 volume percent water in ethanol.

13. A process for producing carbon nanotubes with platinum particles thereon comprising the steps of:
    a) preparing a silane solution of 2(4-chlorosulfonylphenyl) ethyl trichlorosilane and platinum chloride;
    b) immersing a carbon fiber substrate carrying multi-walled carbon nanotubes in the silane solution to yield a composite structure of carbon fiber substrate, carbon nanotubes and platinum particles; and
    c) reducing the composite structure to yield a composite of carbon fiber substrate, multiwalled carbon nanotubes and platinum particles on the nanotubes.

14. The process of claim 13, wherein carbon fiber substrate carrying the carbon nanotubes is immersed in methanol before immersion in the silane solution.

15. A process for producing carbon nanotubes with platinum/ruthenium alloy particles thereon comprising the steps of:
    a) preparing a silane solution of 2-(4-chlorosulfonylphenyl) ethyl trichlorosilane, platinum chloride and ruthenium chloride;
    b) immersing a carbon fiber substrate carrying multi-walled carbon nanotubes in the silane solution to yield a composite structure of carbon fiber substrate, carbon nanotubes and platinum/ruthenium alloy particles; and
    c) reducing the composite structure to yield a composite of carbon fiber substrate, multiwalled carbon nanotubes and platinum/ruthenium alloy particles on the nanotubes.

16. The process of, claim 15, wherein the silane solution contains 0.04 M $PtCl_2$, 0.04 M $RuCl_2$, 1 vol % 2-(4-chlorosulfonylphenyl) ethyl trichlorosilane, and 6 vol % water and the remainder ethanol.

17. The process of claim 15, wherein the substrate carrying the carbon nanotubes is pretreated by one of (i) methanol immersion, (ii) silane pyrolysis in an $H_2$ and Ar atmosphere and (iii) immersion in concentrated 50:50 $H_2SO_4$+$HNO_3$ before immersion in the silane solution.

* * * * *

UNITED STATES PATENT AND TRADEMARK OFFICE
CERTIFICATE OF CORRECTION

PATENT NO. : 7,250,188 B2 Page 1 of 1
APPLICATION NO. : 10/813697
DATED : July 31, 2007
INVENTOR(S) : Jean Pol Dodelet et al.

It is certified that error appears in the above-identified patent and that said Letters Patent is hereby corrected as shown below:

Title Page item 75 - (second Inventor.)
The spelling of "Xuellang Sun" on the issued patent should read --Xueliang Sun--

Signed and Sealed this

Thirtieth Day of October, 2007

JON W. DUDAS
*Director of the United States Patent and Trademark Office*